United States Patent
Chang et al.

(10) Patent No.: US 9,983,699 B2
(45) Date of Patent: May 29, 2018

(54) INPUT DEVICE ADAPTABLE TO USE HABIT AND ADAPTING METHOD THEREFOR

(71) Applicant: DEXIN CORPORATION, New Taipei (TW)

(72) Inventors: Yuan Jung Chang, New Taipei (TW); Shu Sheng Chen, New Taipei (TW)

(73) Assignee: DEXIN CORPORATION, New Taipei (TW)

(*) Notice: Subject to any disclaimer, the term of this patent is extended or adjusted under 35 U.S.C. 154(b) by 73 days.

(21) Appl. No.: 15/046,014

(22) Filed: Feb. 17, 2016

(65) Prior Publication Data

US 2017/0010696 A1 Jan. 12, 2017

(30) Foreign Application Priority Data

Jul. 6, 2015 (TW) .............................. 104121832 A

(51) Int. Cl.
| | |
|---|---|
| *G06F 3/03* | (2006.01) |
| *G06F 3/038* | (2013.01) |
| *G06F 3/0354* | (2013.01) |
| *G06F 3/023* | (2006.01) |

(52) U.S. Cl.
CPC .......... *G06F 3/0383* (2013.01); *G06F 3/0233* (2013.01); *G06F 3/03543* (2013.01)

(58) Field of Classification Search
None
See application file for complete search history.

(56) References Cited

U.S. PATENT DOCUMENTS

| | | | |
|---|---|---|---|
| 2011/0167391 A1* | 7/2011 | Momeyer | G06F 1/1684 715/863 |
| 2016/0179239 A1* | 6/2016 | Marui | G06F 3/043 345/177 |

FOREIGN PATENT DOCUMENTS

| | | |
|---|---|---|
| CN | 101650596 | 2/2010 |
| TW | 201104269 | 2/2011 |
| TW | M469537 | 1/2014 |

OTHER PUBLICATIONS

Office Action issued by the Taiwanese Intellectual Property Office dated Mar. 25, 2016.

* cited by examiner

*Primary Examiner* — Joseph Haley
(74) *Attorney, Agent, or Firm* — IP & T Group LLP

(57) ABSTRACT

An input device adaptable to a use habit includes: a memory, configured to store a preset sampling frequency and the preset number of times of sampling; a keying circuit, configured to produce a keying waveform when one key thereof is pressed; and a microprocessor, configured to perform, according to the preset sampling frequency and the preset number of times of sampling that are stored in the memory, sampling on the keying waveform produced by the keying circuit, to obtain multiple sampling keying signals, and determines the sampling keying signals, which are sampled according to the preset number of times of sampling, in a stable and correct waveform segmentation in the corresponding keying waveform, to send a keying signal corresponding to the keying waveform. In addition, the present invention provides an adapting method for an input device adaptable to a use habit.

8 Claims, 4 Drawing Sheets

INPUT DEVICE ADAPTABLE TO USE HABIT AND ADAPTING METHOD THEREFOR

The present application claims priority of Taiwanese Patent Application No. 104121832, filed on Jul. 6, 2015, which is incorporated herein by reference in its entirety.

BACKGROUND

Technical Field

The present invention relates to the field of technologies of a peripheral device of a computer, and in particular, to an input device adaptable to a use habit and an adapting method therefor.

Related Art

Among common peripheral devices of a computer, a mouse or a keyboard is usually used as an input device. When a key on this type of input devices is pressed, electric contact below the key comes into contact, and therefore, an electrical signal is transmitted between a keying circuit of the input device and a microprocessor, thereby implementing a function of inputting information to a computer by the input device.

When the key of the input device is pressed and released, there is a keying signal bounce reaction time when an electrical signal is output from the keying circuit of the input device to the microprocessor of the input device. The keying signal bounce reaction time directly affects a key reaction speed, and further affects the efficiency of a computer input operation.

SUMMARY

In view of the foregoing problem, the present invention provides an input device adaptable to a use habit and an adapting method therefor. Use habits in which a user uses an input device are collected and counted, and according to the use habits, a sampling frequency and the number of times of sampling according to which a keying waveform of a keying circuit is sampled are properly adjusted automatically or manually, to determine a stable and correct waveform segmentation in the keying waveform, thereby greatly shortening time for determining a keying signal bounce reaction time, and further improving the efficiency of a computer input operation.

A first aspect of the present invention provides an input device adaptable to a use habit, including:

a memory, configured to store a preset sampling frequency and the preset number of times of sampling;

a keying circuit, configured to produce a keying waveform when one key thereof is pressed; and a microprocessor, configured to perform, according to the preset sampling frequency and the preset number of times of sampling that are stored in the memory, sampling on the keying waveform produced by the keying circuit, to obtain multiple sampling keying signals, and determines the sampling keying signals, which are sampled according to the preset number of times of sampling, in a stable and correct waveform segmentation in the corresponding keying waveform, to send a keying signal corresponding to the keying waveform.

A second aspect of the present invention provides an input device adaptable to a use habit, including:

a memory, configured to store a preset sampling frequency and the preset number of times of sampling;

a keying circuit, configured to produce a keying waveform when one key thereof is pressed; and a microprocessor, configured to perform, according to the preset sampling frequency and the preset number of times of sampling, sampling on the keying waveform produced by the keying circuit, to obtain multiple sampling keying signals, analyzes the sampling keying signals, to obtain data of a use habit of a user statistically, then adjusts the preset sampling frequency and the preset number of times of sampling according to the data of the use habit, to obtain an adapted sampling frequency and the adapted number of times of sampling, then performs sampling on the keying waveform of the keying circuit according to the adapted sampling frequency and the adapted number of times of sampling, and determines the sampling keying signals, which are sampled according to the number of times of sampling, in a stable and correct waveform segmentation in the corresponding keying waveform, to send a keying signal corresponding to the keying waveform.

A third aspect of the present invention provides an input device adaptable to a use habit, including:

a memory, configured to store a sampling frequency and the number of times of sampling;

a keying circuit, configured to produce a keying waveform when one key thereof is pressed; and a microprocessor, configured to perform sampling on the keying waveform of the keying circuit according to the sampling frequency and the number of times of sampling, to obtain multiple sampling keying signals, and produces an error signal when determining that the sampling keying signals, which are sampled according to the number of times of sampling, in a stable and correct waveform segmentation in the corresponding keying waveform are wrong.

A fourth aspect of the present invention provides an adapting method for an input device adaptable to a use habit, including the following steps:

when one key of a keying circuit is pressed, the keying circuit producing a keying waveform; and a microprocessor performing, according to a preset sampling frequency and the preset number of times of sampling that are in a memory, sampling on the keying waveform produced by the keying circuit, to obtain multiple sampling keying signals, and determining the sampling keying signals, which are sampled according to the preset number of times of sampling, in a stable and correct waveform segmentation in the corresponding keying waveform, to send a keying signal corresponding to the keying waveform.

A fifth aspect of the present invention provides an adapting method for an input device adaptable to a use habit, including the following steps:

when one key of a keying circuit is pressed, the keying circuit producing a keying waveform;

a microprocessor performing, according to a preset sampling frequency and the preset number of times of sampling that are in a memory, sampling on the keying waveform produced by the keying circuit, to obtain multiple sampling keying signals;

the microprocessor analyzing the sampling keying signals, to obtain data of a use habit of a user statistically;

the microprocessor adjusting the preset sampling frequency and the preset number of times of sampling according to the data of the use habit, to obtain an adapted sampling frequency and the adapted number of times of sampling; and the microprocessor performing sampling on the keying waveform of the keying circuit according to the adapted sampling frequency and the adapted number of times of sampling, to obtain the sampling keying signals, and determining the sampling keying signals, which are sampled according to the adapted number of times of sampling, in a stable and correct waveform segmentation in the corresponding keying waveform, to send a keying signal corresponding to the keying waveform.

A sixth aspect of the present invention provides an adapting method for an input device adaptable to a use habit, including the following steps:

when one key of a keying circuit is pressed, the keying circuit producing a keying waveform;

a microprocessor performing, according to a sampling frequency and the number of times of sampling that are in a memory, sampling on the keying waveform produced by the keying circuit, to obtain multiple sampling keying signals, and the microprocessor producing an error signal when determining that the sampling keying signals, which are sampled according to the number of times of sampling, in a stable and correct waveform segmentation in the corresponding keying waveform are wrong.

DETAILED DESCRIPTION

To enable a person of ordinary skill in the art to which the present invention belongs to further learn about the present invention, the following specially lists several preferred embodiments of the present invention, and illustrates constituent content of the present invention and the effects that the present invention is intended to achieve in detail with reference to the accompanying drawings.

Figure 1:
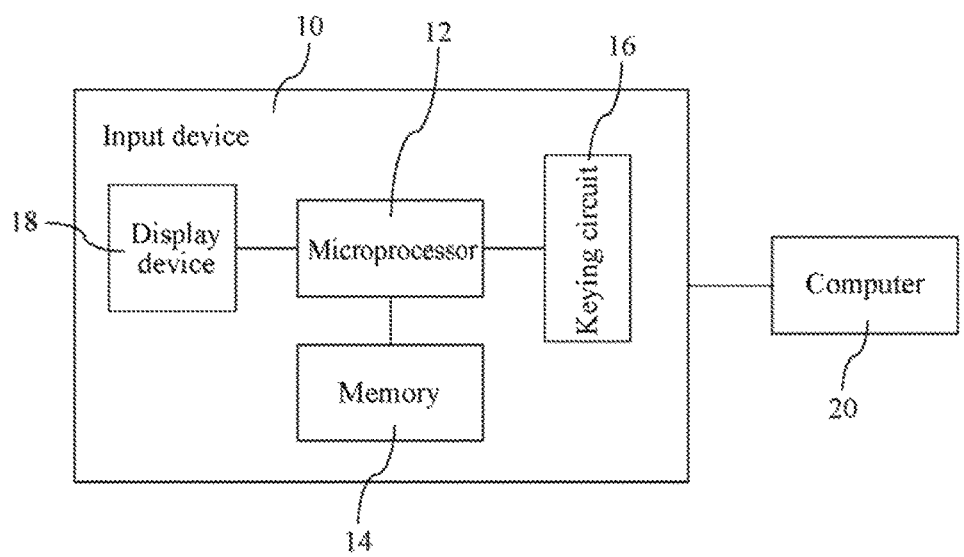
FIG. 1 is a block diagram of an input device adaptable to a use habit according to the present invention.

FIG. 1 is a block diagram of an input device adaptable to a use habit according to the present invention. In FIG. 1, an input device 10 connected to a computer 20 includes a microprocessor 12, a memory 14, a keying circuit 16 having multiple keys (not shown), and a display device 18. The input device 10 may be a peripheral device, such as a mouse or a keyboard. Whether the display device 18 is configured in the input device 10 may be determined according to a requirement.

The memory 14 stores a preset sampling frequency and the preset number of times of sampling. In this embodiment, a preset sampling frequency of sampling of a keying waveform is set as 100 ms, and the preset number of times of sampling of the sampling of the keying waveform is set as that 30 sampling signals are taken out of 100 sampling signals sampled from a keying waveform. The 30 sampling signals may be selecting signals sampled from a stable and correct waveform segmentation in the keying waveform, removing signals sampled from waveform segmentation that has noises and is in the keying waveform, and reducing signals sampled from the stable and correct waveform segmentation in the keying waveform, thereby greatly shortening time for determining a keying signal bounce reaction time, and further improving the efficiency of a computer input operation. The foregoing preset sampling frequency and the preset number of times of sampling are used as an example of the present invention, and are not intended to limit the present invention. The preset sampling frequency and the preset number of times of sampling may be properly selected to implement operations of the present invention.

When a user of the input device 10 presses a key of the keying circuit 16, the keying circuit 16 produces a keying waveform and sends it to the microprocessor 12. The microprocessor 12 performs, according to a preset sampling frequency and the preset number of times of sampling that are stored in the memory 14, sampling on the keying waveform produced by the keying circuit 16, to obtain multiple sampling keying signals. The microprocessor 12 determines the sampling keying signals, which are sampled according to the preset number of times of sampling, in a stable and correct waveform segmentation in the corresponding keying waveform, to send a keying signal corresponding to the keying waveform to the computer 20.

The microprocessor 12 analyzes the sampling keying signals, to obtain data of a use habit of the user statistically, and stores the data of the use habit in the memory 14. The data of the use habit includes the number of times the user presses the key within a whole day, duration during which the key is pressed, and a time interval between successive pressings of the key.

In another embodiment, to shorten time for determining a keying signal bounce reaction time and further improve the efficiency of a computer input operation, a stable and correct waveform segmentation in the keying waveform may also be determined after a use habit in which a user uses an input device is collected and counted and the microprocessor 12 automatically and properly adjusts, according to the use habit, an adapted sampling frequency and the adapted number of times of sampling according to which a keying waveform of the keying circuit 16 is sampled, for example, a preset sampling frequency of 100 ms is changed to an adapted sampling frequency of 200 ms, and the preset number of times of sampling is changed to the adapted number of times of sampling, where the preset number of times of sampling is taking 30 sampling signals out of 100 sampling signals sampled from a keying waveform, and the adapted number of times of sampling is taking 20 sampling signals out of 100 sampling signals sampled from a keying waveform. The microprocessor 12 stores the adapted sampling frequency and the adapted number of times of sampling in the memory 14.

The microprocessor 12 performs, according to the adapted sampling frequency and the adapted number of times of sampling that are stored in the memory 14, sampling on the keying waveform produced by the keying circuit 16, to obtain multiple sampling keying signals. The microprocessor 12 determines the sampling keying signals, which are sampled according to the adapted number of times of sampling, in a stable and correct waveform segmentation in the corresponding keying waveform, to send a keying signal corresponding to the keying waveform to the computer 20.

In still another embodiment, the microprocessor 12 performs, according to a preset sampling frequency and the preset number of times of sampling or an adapted sampling frequency and the adapted number of times of sampling that are stored in the memory 14, sampling on a keying waveform produced by the keying circuit 16, to obtain multiple sampling keying signals; and the microprocessor 12 produces an error signal when determining that the sampling keying signals, which are sampled according to the number of times of sampling, in a stable and correct waveform segmentation in the corresponding keying waveform are wrong, and sends the error signal to the display device 18 of the input device 10 or the computer 20.

The display device 18 displays a fault prompt or a keying waveform of an error waveform after receiving the error signal sent by the microprocessor 12. The computer 20 displays a fault prompt or a keying waveform of an error waveform on a screen (not shown) after receiving the error signal sent by the microprocessor 12. When seeing the fault prompt or the keying waveform of the error waveform on the display device 18 or the screen of the computer 20, a user knows that a key producing the wrong keying waveform and electric contact thereof are failed, and the user may change the failed key and the electric contact.

An adapting method for an input device adaptable to a use habit in the following embodiments of the present invention is described with reference to the block diagram of an input device adaptable to a use habit.

First Embodiment

Figure 2:
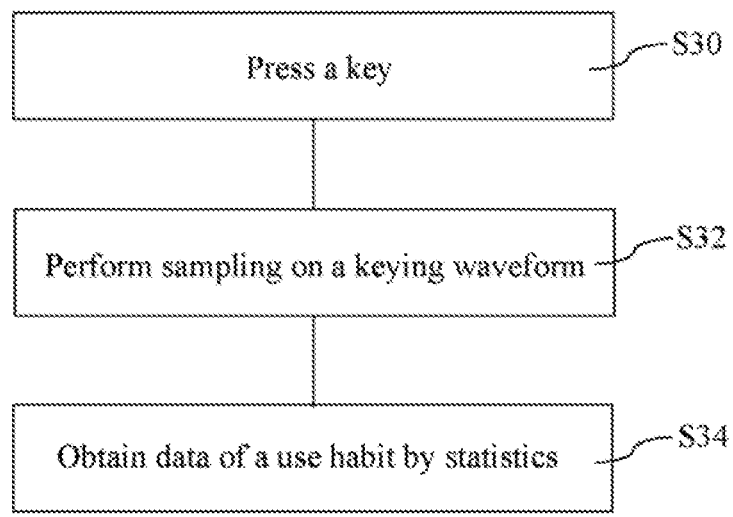
FIG. 2 is a flowchart of an adapting method for an input device adaptable to a use habit according to a first embodiment of the present invention.

FIG. 2 is a flowchart of an adapting method for an input device adaptable to a use habit according to a first embodiment of the present invention. In the first embodiment, a user of an input device stores, according to a use habit thereof, data such as the foregoing preset sampling frequency (100 ms) and preset number of times of sampling (30 sampling signals are taken out of 100 sampling signals in a keying waveform) in a memory 14 in advance.

In FIG. 2, an input device 10, which is a mouse or a keyboard, is connected to a computer 20. When a key of a keying circuit 16 of the input device 10 is pressed, the keying circuit 16 produces a keying waveform and sends it to a microprocessor 12 (step S30).

The microprocessor 12 performs, according to the preset sampling frequency and the preset number of times of sampling that are stored in the memory 14, sampling on the keying waveform produced by the keying circuit 16, to obtain multiple sampling keying signals (for example, 100 sampling keying signals); and the microprocessor 12 determines sampling keying signals (30 sampling keying signals are taken out of 100 sampling keying signals in a keying waveform), which are sampled according to the preset number of times of sampling, in a stable and correct waveform segmentation in the corresponding keying waveform, and when determining a correct state of the keying waveform by means of the sampled sampling keying signals, the microprocessor 12 sends a keying signal corresponding to the keying waveform to the computer 20 (step S32).

The microprocessor 12 analyzes the sampling keying signals, to obtain data of a use habit of the user statistically, and stores the data of the use habit in the memory 14 (step S34). The data of the use habit includes the number of times the user presses the key within a whole day, duration during which the key is pressed, and a time interval between successive pressings of the key.

Second Embodiment

Figure 3:
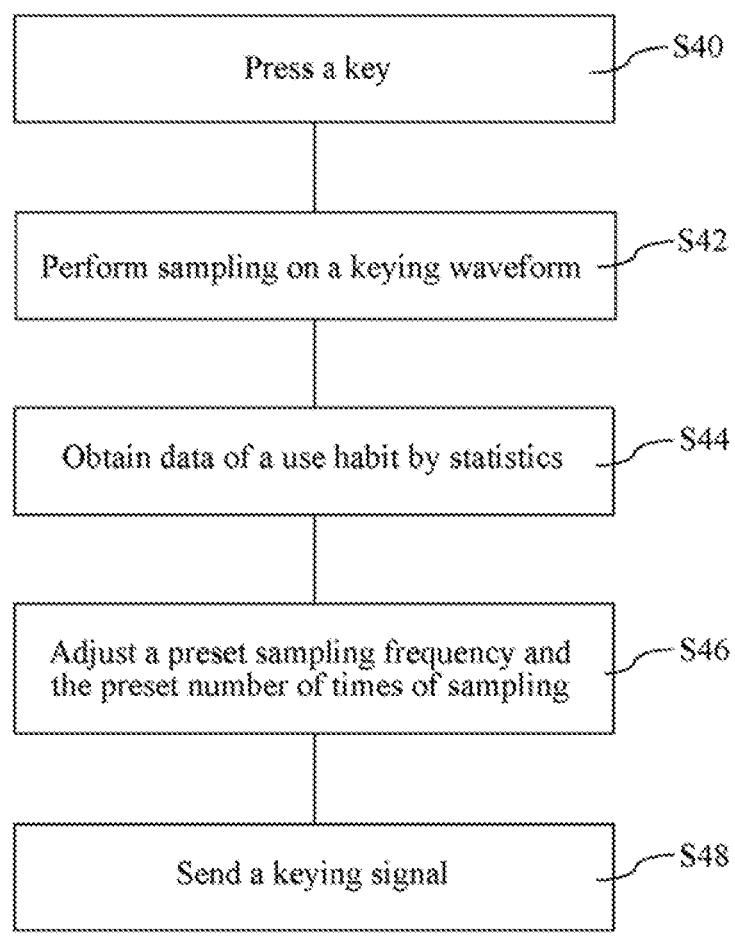
FIG. 3 is a flowchart of an adapting method for an input device adaptable to a use habit according to a second embodiment of the present invention.

FIG. 3 is a flowchart of an adapting method for an input device adaptable to a use habit according to a second embodiment of the present invention. In the second embodiment, data such as the foregoing preset sampling frequency (100 ms) and preset number of times of sampling (30 sampling signals are taken out of 100 sampling signals in a keying waveform) are stored in a memory 14 in advance.

In FIG. 3, an input device 10, which is a mouse or a keyboard, is connected to a computer 20. When a key of a keying circuit 16 of the input device 10 is pressed, the keying circuit 16 produces a keying waveform and sends it to a microprocessor 12 (step S40).

The microprocessor 12 performs, according to the preset sampling frequency and the preset number of times of sampling that are stored in the memory 14, sampling on the keying waveform produced by the keying circuit 16, to obtain multiple sampling keying signals (for example, 100 sampling keying signals) and the microprocessor 12 determines sampling keying signals (30 sampling keying signals are taken out of 100 sampling keying signals in a keying waveform), which are sampled according to the preset number of times of sampling, in a stable and correct waveform segmentation in the corresponding keying waveform, and when determining a correct state of the keying waveform by means of the sampled sampling keying signals, the microprocessor 12 sends a keying signal corresponding to the keying waveform to the computer 20 (step S42).

The microprocessor 12 analyzes the sampling keying signals, to obtain data of a use habit of the user statistically, and stores the data of the use habit in the memory 14 (step S44). The data of the use habit includes the number of times the user presses the key within a whole day, duration during which the key is pressed, and a time interval between successive pressings of the key.

After the microprocessor 12 obtains the data of the use habit by collecting and counting use habits in which the user uses the input device, and the microprocessor 12 automatically and properly adjusts, according to the data of the use habit, the foregoing adapted sampling frequency (200 ms) and adapted number of times of sampling (for example, 20 sampling keying signals are taken out of 100 sampling keying signals in a keying waveform) according to which the keying waveform of the keying circuit 16 is sampled, a stable and correct waveform segmentation in the keying waveform may also be determined (step S46). The microprocessor 12 stores the adapted sampling frequency and the adapted number of times of sampling in the memory 14.

The microprocessor 12 performs, according to the adapted sampling frequency and the adapted number of times of sampling that are stored in the memory 14, sampling on the keying waveform produced by the keying circuit 16, to obtain multiple sampling keying signals (for example, 100 sampling keying signals); and the microprocessor 12 determines sampling keying signals (20 sampling keying signals are taken out of 100 sampling keying signals in a keying waveform), which are sampled according to the adapted number of times of sampling, in a stable and correct waveform segmentation in the corresponding keying waveform, and when determining a correct state of the keying waveform by means of the sampled sampling keying signals, the microprocessor 12 sends a keying signal corresponding to the keying waveform to the computer 20 (step S48).

Third Embodiment

Figure 4:
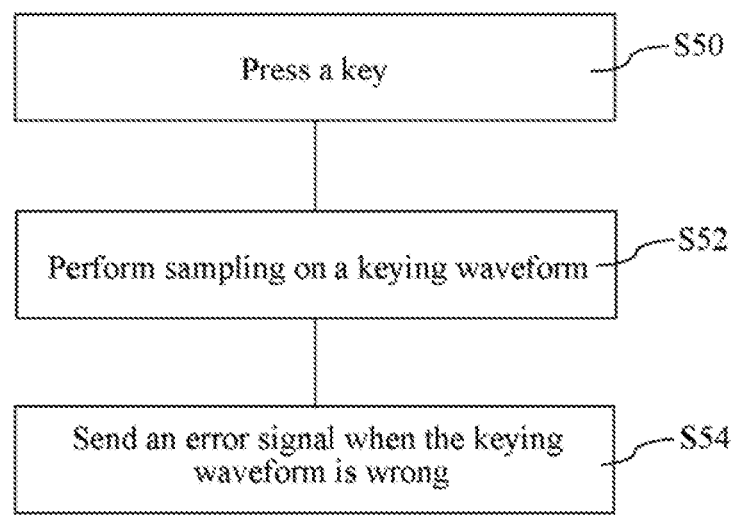
FIG. 4 is a flowchart of an adapting method for an input device adaptable to a use habit according to a third embodiment of the present invention.

FIG. 4 is a flowchart of an adapting method for an input device adaptable to a use habit according to a third embodiment of the present invention. In the third embodiment, data such as the foregoing preset sampling frequency (100 ms) and preset number of times of sampling (30 sampling signals are taken out of 100 sampling signals in a keying waveform) are stored in a memory 14 in advance.

In FIG. 4, an input device 10, which is a mouse or a keyboard, is connected to a computer 20. When a key of a keying circuit 16 of the input device 10 is pressed, the keying circuit 16 produces a keying waveform and sends it to a microprocessor 12 (step S50).

The microprocessor 12 performs, according to the preset sampling frequency and the preset number of times of sampling that are stored in the memory 14, sampling on the keying waveform produced by the keying circuit 16, to obtain multiple sampling keying signals (for example, 100 sampling keying signals); and the microprocessor 12 produces an error signal when determining that the sampling keying signals, which are sampled according to the number of times of sampling (30 sampling keying signals are taken out of 100 sampling keying signals in a keying waveform), in a stable and correct waveform segmentation in the corresponding keying waveform are wrong, and sends the error signal to the display device 18 or computer 20 (step S52).

The display device 18 displays a fault prompt or a keying waveform of an error waveform after receiving the error signal sent by the microprocessor 12; or the computer 20 displays a fault prompt or a keying waveform of an error waveform on a screen (not shown) after receiving the error signal sent by the microprocessor 12 (step S54).

When seeing the fault prompt or the keying waveform of the error waveform on the display device 18 or the screen of the computer 20, a user knows that a key producing the wrong keying waveform and electric contact thereof are failed, and the user may change the failed key and the electric contact.

The present invention provides an input device adaptable to a use habit and an adapting method therefor. The advantages thereof lie in that, use habits in which a user uses an input device are collected and counted, and according to the use habits, a sampling frequency and the number of times of sampling according to which a keying waveform of a keying circuit is sampled are properly adjusted automatically or manually, to obtain determination of a stable and correct waveform segmentation in the keying waveform, thereby greatly shortening time for determining a keying signal bounce reaction time, and further improving the efficiency of a computer input operation. Moreover, it is known whether the key and electric contact thereof are failed by determining the keying waveform.

Although in the present invention, reference is made to preferred specific examples and the exemplary accompanying drawings as described above, the specific examples and exemplary accompanying drawings should not be construed as a limitation. Any modification, omission, and variation made by a person skilled in the art on the shape of the invention and content of the specific examples shall not depart from the claimed scope of the claims of the present invention.

What is claimed is:

1. An input device adaptable to a use habit, comprising:
   a memory, configured to store a preset sampling frequency and the preset number of times of sampling;
   a keying circuit, configured to produce a keying waveform when one key thereof is pressed; and
   a microprocessor, configured to perform, according to the preset sampling frequency and the preset number of times of sampling that are stored in the memory, sampling on the keying waveform produced by the keying circuit, to obtain multiple sampling keying signals, and determines the sampling keying signals, which are sampled according to the preset number of times of sampling, in a stable and correct waveform segmentation in the corresponding keying waveform, to send a keying signal corresponding to the keying waveform,
   wherein the microprocessor analyzes the sampling keying signals, to obtain data of a use habit of a user statistically, and stores the data of the use habit in the memory, wherein the data of the use habit comprises the number of times the user presses the key within a whole day, duration during which the key is pressed, and a time interval between successive pressings of the key.

2. The input device according to claim 1, wherein the input device is a mouse or a keyboard.

3. An input device adaptable to a use habit, comprising:
   a memory, configured to store a preset sampling frequency and the preset number of times of sampling;
   a keying circuit, configured to produce a keying waveform when one key thereof is pressed; and
   a microprocessor, configured to perform, according to the preset sampling frequency and the preset number of times of sampling, sampling on the keying waveform produced by the keying circuit, to obtain multiple sampling keying signals, analyzes the sampling keying signals, to obtain data of a use habit of a user statistically, then adjusts the preset sampling frequency and the preset number of times of sampling according to the data of the use habit, to obtain an adapted sampling frequency and the adapted number of times of sampling, then performs sampling on the keying waveform of the keying circuit according to the adapted sampling frequency and the adapted number of times of sampling, and determines the sampling keying signals, which are sampled according to the number of times of sampling, in a stable and correct waveform segmentation in the corresponding keying waveform, to send a keying signal corresponding to the keying waveform.

4. The input device according to claim 3, wherein the microprocessor stores the adapted sampling frequency, the adapted number of times of sampling, and the data of the use habit in the memory, and the data of the use habit comprises the number of times the user presses the key within a whole day, duration during which the key is pressed, and a time interval between successive pressings of the key.

5. The input device according to claim 3, wherein the input device is a mouse or a keyboard.

6. An adapting method for an input device adaptable to a use habit, comprising the following steps:
   when one key of a keying circuit is pressed, the keying circuit producing a keying waveform; and
   a microprocessor performing, according to a preset sampling frequency and the preset number of times of sampling that are in a memory, sampling on the keying waveform produced by the keying circuit, to obtain multiple sampling keying signals, and determining the sampling keying signals, which are sampled according to the preset number of times of sampling, in a stable and correct waveform segmentation in the corresponding keying waveform, to send a keying signal corresponding to the keying waveform,
   wherein the microprocessor analyzes the sampling keying signals, to obtain data of a use habit of a user statistically, and
   wherein the microprocessor stores the data of the use habit in the memory, and the data of the use habit comprises the number of times the user presses the key within a whole day, duration during which the key is pressed, and a time interval between successive pressings of the key.

7. An adapting method for an input device adaptable to a use habit, comprising the following steps:
- when one key of a keying circuit is pressed, the keying circuit producing a keying waveform;
- a microprocessor performing, according to a preset sampling frequency and the preset number of times of sampling that are in a memory, sampling on the keying waveform produced by the keying circuit, to obtain multiple sampling keying signals;
- the microprocessor analyzing the sampling keying signals, to obtain data of a use habit of a user statistically;
- the microprocessor adjusting the preset sampling frequency and the preset number of times of sampling according to the data of the use habit, to obtain an adapted sampling frequency and the adapted number of times of sampling; and
- the microprocessor performing sampling on the keying waveform of the keying circuit according to the adapted sampling frequency and the adapted number of times of sampling, to obtain the sampling keying signals, and determining the sampling keying signals, which are sampled according to the adapted number of times of sampling, in a stable and correct waveform segmentation in the corresponding keying waveform, to send a keying signal corresponding to the keying waveform.

8. The adapting method according to claim 7, wherein the microprocessor stores the adapted sampling frequency, the adapted number of times of sampling, and the data of the use habit in the memory, and the data of the use habit comprises the number of times the user presses the key within a whole day, duration during which the key is pressed, and a time interval between successive pressings of the key.

* * * * *